(12) United States Patent
Bulan et al.

(10) Patent No.: US 6,779,549 B2
(45) Date of Patent: Aug. 24, 2004

(54) IN-LINE VACUUM BREAKER

(75) Inventors: Jamy E. Bulan, Lakewood, OH (US); Norman Kummerlen, Lorain, OH (US)

(73) Assignee: Moen Incorporated, North Olmstead, OH (US)

(*) Notice: Subject to any disclaimer, the term of this patent is extended or adjusted under 35 U.S.C. 154(b) by 23 days.

(21) Appl. No.: 10/281,841

(22) Filed: Oct. 28, 2002

(65) Prior Publication Data

US 2004/0079412 A1 Apr. 29, 2004

(51) Int. Cl.⁷ .............................................. E03C 1/10
(52) U.S. Cl. ..................................................... 137/218
(58) Field of Search ......................................... 137/218

(56) References Cited

U.S. PATENT DOCUMENTS

| | | | |
|---|---|---|---|
| 3,805,772 A | 4/1974 | Mickelson | |
| 3,917,172 A | 11/1975 | O'Hare | |
| 4,064,896 A | * 12/1977 | Trenary | 137/218 |
| 4,589,438 A | 5/1986 | Breda | |
| 4,874,006 A | 10/1989 | Iqbal | |
| 4,953,585 A | 9/1990 | Rollini et al. | |
| 5,038,814 A | 8/1991 | Gayton et al. | |
| 5,056,544 A | 10/1991 | Stevens | |
| 5,060,687 A | 10/1991 | Gayton | |
| 5,103,856 A | 4/1992 | Fleischmann | |
| 5,220,697 A | 6/1993 | Birchfield | |
| 5,279,324 A | 1/1994 | Schutz et al. | |
| 5,361,431 A | 11/1994 | Freier et al. | |
| 5,402,822 A | 4/1995 | Brouwer et al. | |
| 5,575,424 A | 11/1996 | Fleischmann | |
| 5,632,303 A | 5/1997 | Almasy et al. | |
| 5,655,563 A | 8/1997 | Johnson | |
| 5,685,330 A | 11/1997 | Breda | |
| 5,701,926 A | 12/1997 | Luisi | |
| 5,738,135 A | 4/1998 | Johnson | |
| 5,845,345 A | 12/1998 | Ko | |
| 5,845,670 A | 12/1998 | Life | |
| 5,901,735 A | 5/1999 | Breda | |
| 5,970,534 A | 10/1999 | Breda | |
| 6,070,614 A | 6/2000 | Holzheimer et al. | |
| 6,079,447 A | 6/2000 | Holzheimer et al. | |
| 6,112,342 A | 9/2000 | Breda | |
| 6,125,875 A | 10/2000 | Dempsey et al. | |
| 6,154,897 A | 12/2000 | Paini | |
| 6,230,989 B1 | 5/2001 | Haverstraw et al. | |
| 6,253,394 B1 | 7/2001 | Goyette et al. | |
| 6,317,905 B1 | 11/2001 | Slothower | |

FOREIGN PATENT DOCUMENTS

GB        1510895    * 5/1978    ................. 137/218

* cited by examiner

*Primary Examiner*—Gerald A. Michalsky
(74) *Attorney, Agent, or Firm*—Calfee, Halter & Griswold LLP

(57) ABSTRACT

An in-line vacuum breaker for a flexible hand held shower. The vacuum breaker includes a frusto-conical body with a water flow passage extending therethrough. The frusto-conical body has an inlet cavity at one end and an outlet cavity at the opposite end. An outlet plug is threaded into the outlet cavity. A first passage formed in the outlet plug leads to an outlet opening. A second passage in the outlet plug extends parallel to the first passage and leads to a vent opening. A manifold passage defined in the outlet cavity by the body and the outlet plug connects the body passage and the first and second passages. A first check valve in the first passage permits fluid flow only from the manifold passage to the outlet opening. A second check valve positioned in the second passage prevents fluid flow from the manifold passage to the vent opening. A third check valve positioned in the body passage permits fluid flow only from the body inlet opening to the manifold passage.

5 Claims, 2 Drawing Sheets

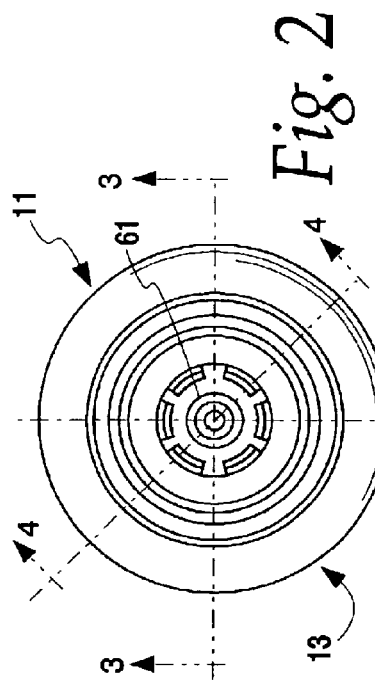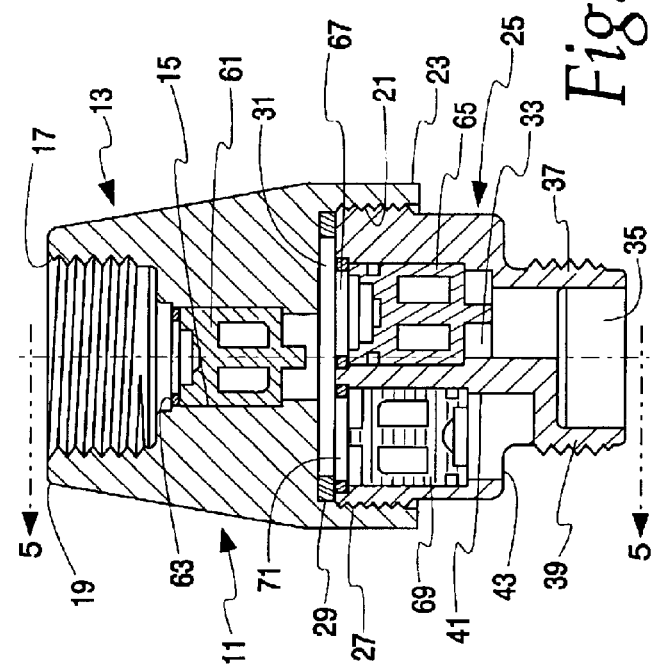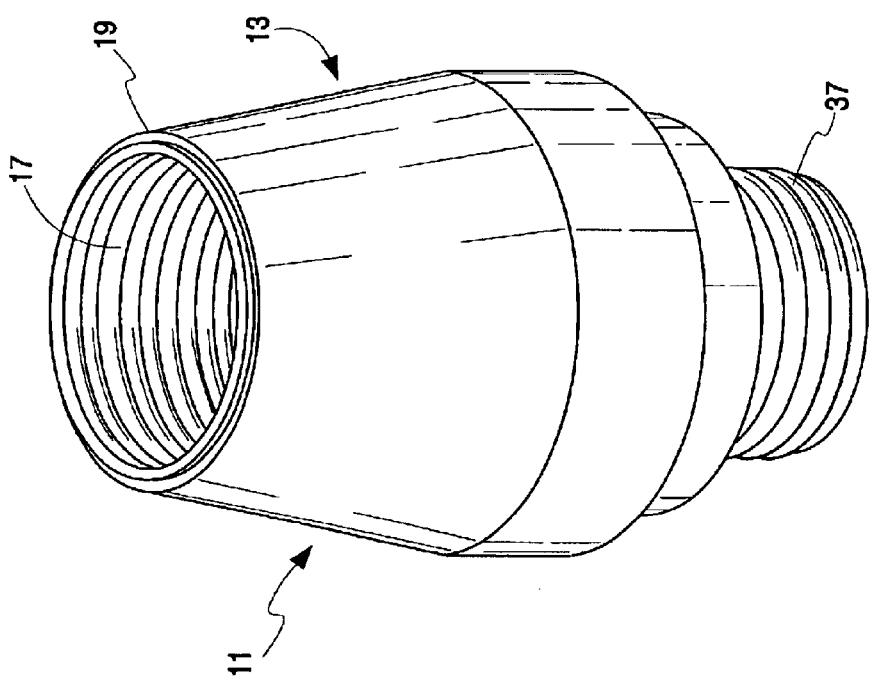

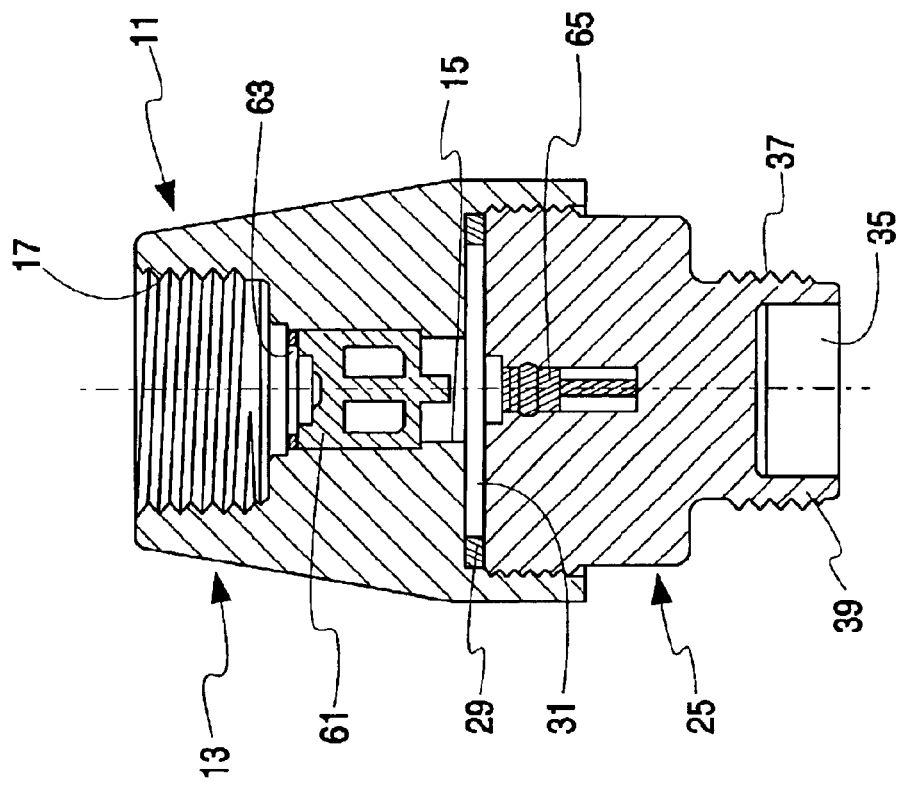
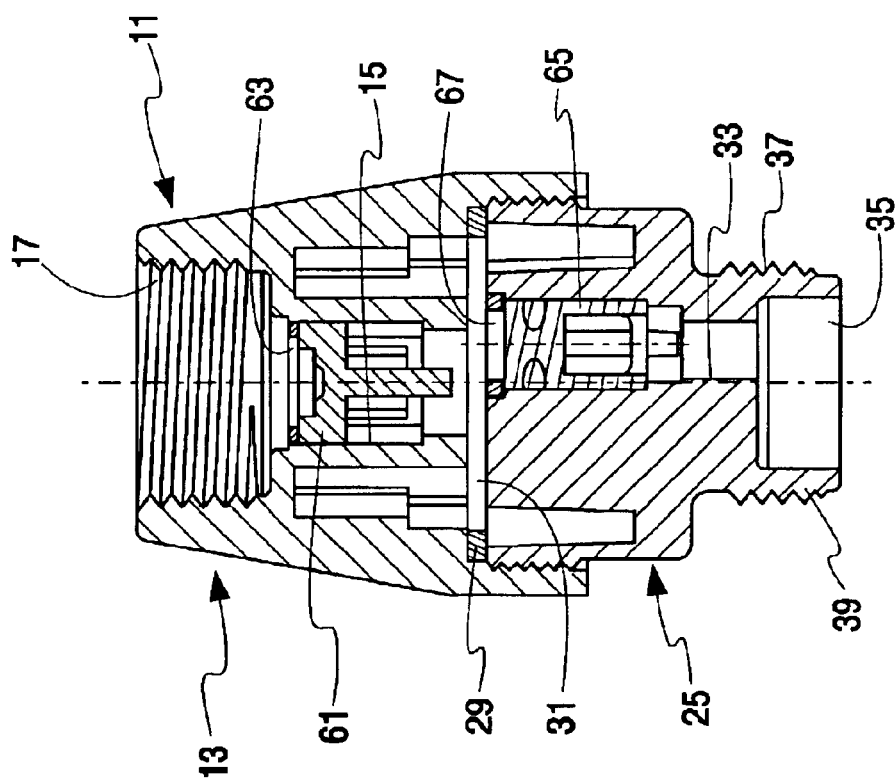

IN-LINE VACUUM BREAKER

BACKGROUND AND SUMMARY OF THE INVENTION

Vacuum breakers are required in many types of domestic and commercial plumbing fixtures especially fixtures such as pull-outs sprays for kitchen sinks and hand held showers for bathroom use in which the spray or shower head could draw contaminated water into the clean water supply in the event of a pressure drop in the clean water supply.

Previous vacuum breakers have not been suitable for use in hand held showers because of their bulky size, the large high pressure drop experienced upon normal flow through the vacuum breaker and the need for the vacuum breaker to be mounted in a fixed position.

This invention is directed to an in-line vacuum breaker for a hand held shower or pull-out spray which is compact, fits in a hose leading to the shower or spray, and can be easily installed and removed by a user.

An object of this invention is an in-line vacuum breaker which has a low pressure drop during normal water flow therethrough.

Another object of this invention is an in-line vacuum breaker which uses conventional check valves to control water flow and to control venting to relieve any vacuum which may be created.

Yet another object of this invention is a compact, in-line vacuum breaker which can be installed in a water supply hose to a pull-out spray or a hand held shower.

Still another object of this invention is an in-line vacuum breaker in which the vent check valve is located out of the path of water flow through the vacuum breaker housing.

Other objects of the invention will be found in the following specification, claims, and drawings.

BRIEF DESCRIPTION OF THE DRAWINGS

The invention is illustrated more or less diagrammatically in the following drawings wherein:

FIG. 1 is an isometric view of the in-line vacuum breaker of this invention;

FIG. 2 is a top-plan view of the vacuum breaker of FIG. 1;

FIG. 3 is a cross-sectional view taken along line 3—3 of FIG. 2;

FIG. 4 is a cross-sectional view taken along line 4—4 of FIG. 2; and

FIG. 5 is a cross-sectional view taken along line 5—5 of FIG. 3.

DESCRIPTION OF THE PREFERRED EMBODIMENT

The in-line vacuum breaker of this invention is shown in FIGS. 1–5 of the drawings. The vacuum breaker includes a frusto-conical body 13 having a passage 15 extending therethrough. An internally threaded opening 17 leads into the passage 15 and is located at the narrow end 19 of the frusto-conical body 13.

An internally threaded outlet cavity 21 is formed at the wider end 23 of the frusto-conical body. An outlet plug 25 having external threads 27 screws into the threaded outlet cavity 21 where it engages an annular gasket 29 to provide a water-tight seal between the frusto-conical body 21 and the outlet plug 25. A manifold passage 31 is established between the frusto-conical body 13 and the outlet plug 25.

A first passage 33 formed in the outlet plug 25 connects the manifold passage 31 with an outlet opening 35 in the outlet plug. External threads 37 are formed on the outlet plug around the outer surface of a collar 39 surrounding the outlet opening 35. A second passage 41 is formed in the outlet plug and extends parallel to the first passage. The second passage 41 connects the manifold passage 31 with a vent opening 43 which extends through the wall of the outlet plug. The vent opening is positioned axially inwardly of the external threads 37 of the outlet plug collar 39.

A first check valve 61 is installed in the passage 15 extending through the frusto-conical body 13 and is held in position by a retaining ring 63. This check valve permits water flow from the inlet opening 17 to the manifold passage 31 located between the frusto-conical body and the outlet plug 25, and prevents water flow in the reverse direction. A check valve suitable for this purpose is sold under the trademark "NEOPERL" by Hans Denzler & Co. AG of Switzerland. A second check valve 65 of the same type as check valve 61 is installed in the first passage 33 of the outlet plug and is held by a retaining ring 67. The second check valve permits water flow from the manifold passage 31 to the outlet opening 35 of the outlet plug, and prevents water flow in the reverse direction. A third vent check valve 69 is installed in the second passage 41 of the outlet plug and permits the flow of air from the vent opening 43 in the outlet plug into the manifold passage 31, and prevents the flow of water through the vent opening. It is held in position by a retaining ring 71. A vent check valve suitable for this use is also sold by Hans Denzler & Co. AG. The vent check valve 69 is similar to check valves 61 and 65, but has one-half the spring rate of these valves.

The in-line vacuum breaker 11 of this invention can easily be installed in a flexible hose with the male threads of the hose threaded into the threaded inlet opening 17 of the frusto-conical body 13. A portion of a hose leading to a hand held pull-out spray or hand held shower can be connected to the external threads 27 on the outlet plug 25 to provide water flow through the frusto conical body from inlet opening 17 to outlet opening 35. Such water flow will pass through the first check valve 61 in the passage 15 of the frusto-conical body 13 and through the second check valve 65 in the first passage 33 of the outlet plug 25 which are fluidly connected by the manifold passage 31. Water entering the manifold passage 31 also flows into the second passage 41 in the outlet plug where it flows against the vent check valve 69 which prevents water from escaping through the vent opening 43 in the outlet plug.

In the event of a drop in water pressure being supplied to the inlet opening 17 of the frusto-conical body 13, the first and second check valves 61 and 65, respectfully, will move to their closed positions to prevent the back flow of water into the water supply, and the vent check valve 69 will move to its open position allowing air to enter through the vent opening 43 to break the vacuum and prevent the siphoning of water in a reverse direction through the frusto-conical body 13 and into the water supply.

What is claimed is:

1. An in-line vacuum breaker comprising:

a body having a passage extending therethrough, an inlet opening into said passage at one end of said body, an outlet cavity formed in said body at the other end thereof, an outlet plug seated in said outlet cavity, a first passage in said outlet plug leading to an outlet opening in said outlet plug, a second passage in said outlet plug extending parallel to said first passage and leading to a vent opening, a manifold passage defined in said outlet cavity by said body and said outlet plug with said manifold passage connecting said body passage, said first outlet plug passage and said second outlet plug passage, a first check valve positioned in said first passage in said outlet plug and arranged to permit the flow of fluid from said manifold passage to said outlet opening, a second check valve positioned in said second passage in said outlet plug and arranged to prevent the flow of fluid from said manifold passage to said vent opening, and a third check valve positioned in said body passage and arranged to permit the flow of fluid through said body passage from said inlet opening to said manifold passage.

2. The in-line vacuum breaker of claim 1 in which said second check valve opens to allow air to flow into said manifold passage when a vacuum is created in said manifold passage.

3. The in-line vacuum breaker of claim 1 in which said second check valve is located out of the path of fluid flow from said manifold passage to said outlet opening.

4. The in-line vacuum breaker of claim 1 in which said manifold passage is cylindrical.

5. The in-line vacuum breaker of claim 1 in which said first passage in said outlet plug is in substantial axial alignment with said body passage.

* * * * *